US012712788B2

(12) United States Patent
Mahamuni et al.

(10) Patent No.: US 12,712,788 B2
(45) Date of Patent: Aug. 18, 2026

(54) AI BASED SERVICE COMPOSER ADVISORY FOR COMPLEX PUBLIC CLOUD SERVICES

(71) Applicant: Kyndryl, Inc., New York, NY (US)

(72) Inventors: Amol Mahamuni, Bangalore (IN); Mahesh Sondkar, Pune (IN); Bala Srinivas Vanapalli, Hyderabad (IN); Shankaramurthy K V, Bangalore (IN)

(73) Assignee: Kyndryl, Inc., New York, NY (US)

(*) Notice: Subject to any disclaimer, the term of this patent is extended or adjusted under 35 U.S.C. 154(b) by 33 days.

(21) Appl. No.: 18/808,927

(22) Filed: Aug. 19, 2024

(65) Prior Publication Data

US 2026/0052072 A1 Feb. 19, 2026

(51) Int. Cl.

| | |
|---|---|
| ***G06F 15/173*** | (2006.01) |
| ***H04L 41/16*** | (2022.01) |
| ***H04L 67/306*** | (2022.01) |
| ***H04L 67/51*** | (2022.01) |

(52) U.S. Cl.
CPC ............ *H04L 41/16* (2013.01); *H04L 67/306* (2013.01); *H04L 67/51* (2022.05)

(58) Field of Classification Search
CPC ........ H04L 41/16; H04L 67/51; H04L 67/306
USPC ................................................. 709/223, 224
See application file for complete search history.

(56) References Cited

U.S. PATENT DOCUMENTS

| | | | | |
|---|---|---|---|---|
| 10,530,632 | B1 * | 1/2020 | Mukhopadhyaya | H04L 43/20 |
| 11,108,655 | B2 | 8/2021 | Gangadhar | |
| 11,294,759 | B2 | 4/2022 | Duesterwald | |
| 11,842,379 | B2 * | 12/2023 | Walker | G06N 3/08 |
| 12,395,479 | B1 * | 8/2025 | Butler | H04L 63/08 |
| 2013/0272305 | A1 * | 10/2013 | Lefebvre | H04L 45/306 370/392 |
| 2021/0174230 | A1 * | 6/2021 | Liu | G06Q 30/0631 |
| 2022/0414718 | A1 * | 12/2022 | Marinaro | G06Q 30/0281 |
| 2023/0031636 | A1 | 2/2023 | Dong | |
| 2023/0108560 | A1 | 4/2023 | Wang | |

* cited by examiner

*Primary Examiner* — Kaylee J Huang
(74) *Attorney, Agent, or Firm* — CANTOR COLBURN LLP; Erik Swanson

(57) ABSTRACT

An approach is disclosed for training an artificial intelligence (AI) model to recommend services for a complex composite service chain in a cloud computing platform. The training uses metadata from various services provided by different service providers. The method involves inputting a first service into the trained AI model, which then suggests recommended services. These recommendations are displayed to a user, who selects one of the suggested services. The selected service is displayed as part of the service chain. The AI model then processes metadata from the selected service to provide additional service recommendations. This iterative process continues, with the AI model being further trained based on user selections to improve its recommendations.

20 Claims, 9 Drawing Sheets

FIG. 6

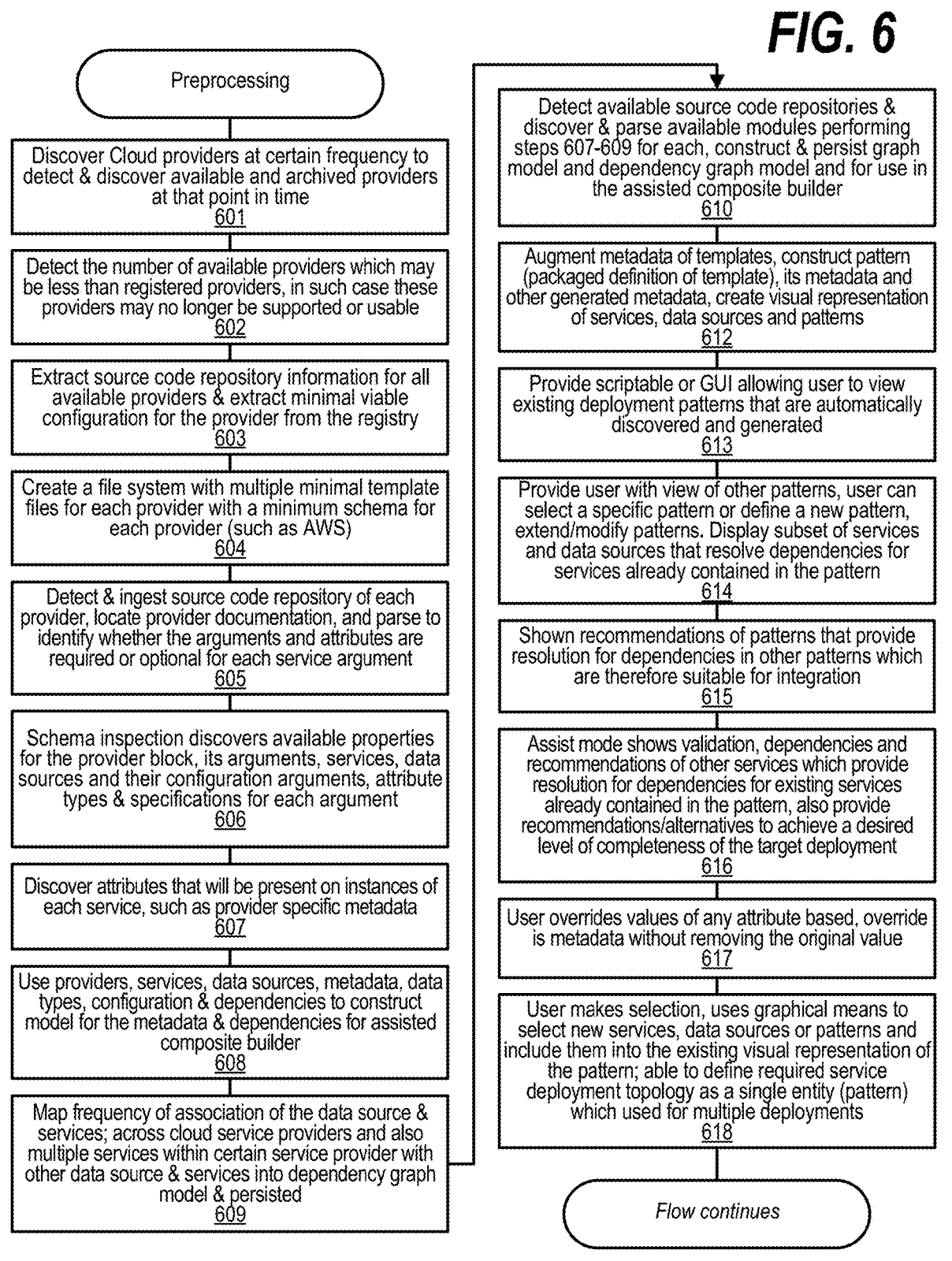

Preprocessing

Discover Cloud providers at certain frequency to detect & discover available and archived providers at that point in time
601

Detect the number of available providers which may be less than registered providers, in such case these providers may no longer be supported or usable
602

Extract source code repository information for all available providers & extract minimal viable configuration for the provider from the registry
603

Create a file system with multiple minimal template files for each provider with a minimum schema for each provider (such as AWS)
604

Detect & ingest source code repository of each provider, locate provider documentation, and parse to identify whether the arguments and attributes are required or optional for each service argument
605

Schema inspection discovers available properties for the provider block, its arguments, services, data sources and their configuration arguments, attribute types & specifications for each argument
606

Discover attributes that will be present on instances of each service, such as provider specific metadata
607

Use providers, services, data sources, metadata, data types, configuration & dependencies to construct model for the metadata & dependencies for assisted composite builder
608

Map frequency of association of the data source & services; across cloud service providers and also multiple services within certain service provider with other data source & services into dependency graph model & persisted
609

Detect available source code repositories & discover & parse available modules performing steps 607-609 for each, construct & persist graph model and dependency graph model and for use in the assisted composite builder
610

Augment metadata of templates, construct pattern (packaged definition of template), its metadata and other generated metadata, create visual representation of services, data sources and patterns
612

Provide scriptable or GUI allowing user to view existing deployment patterns that are automatically discovered and generated
613

Provide user with view of other patterns, user can select a specific pattern or define a new pattern, extend/modify patterns. Display subset of services and data sources that resolve dependencies for services already contained in the pattern
614

Shown recommendations of patterns that provide resolution for dependencies in other patterns which are therefore suitable for integration
615

Assist mode shows validation, dependencies and recommendations of other services which provide resolution for dependencies for existing services already contained in the pattern, also provide recommendations/alternatives to achieve a desired level of completeness of the target deployment
616

User overrides values of any attribute based, override is metadata without removing the original value
617

User makes selection, uses graphical means to select new services, data sources or patterns and include them into the existing visual representation of the pattern; able to define required service deployment topology as a single entity (pattern) which used for multiple deployments
618

*Flow continues*

FIG. 7

Preprocessing, continued

Use Policy as Code to orchestrate a pipeline for resiliency and self healing with decisions to be taken in case of deployment failure
719

Optimized infrastructure deployment planning & validation will continually monitor provider to retrieve & cross-correlate state, metadata & configuration of all services & configuration for the provider, including all regions, data-centers, availability zones, network uplinks downlinks & their availability , to create a virtual representation of the provider itself, complete with the metadata & topology of all the services that exist at the provider, by using event based, poll based, methods to be notified of changes at the provider that must be synchronized
720

Optimized infrastructure deployment planning & validation to create knowledge base of dependencies and multi-variate correlation of state, metadata & configuration of various services across cloud providers to arrive at application specific delineation, business service classification, organization or hierarchy applied to the hierarchical topology as seen fit by the user for their business use
721

In order to ensure that the requested services are not lost or removed during the course of the deployment, the Optimized infrastructure deployment planning & validation will reserve or clone any services for which the provider supports creating perfect copies, & reserve for the ones the provider allows to reserve, and dynamically persist, till projected overall deployment latency, to ensure the actual provisioning does not fail. These persisted clones at the time of deployment will have to go through provisioning compliance to ensure it caters to any vulnerability compliance and security considerations
722

Based on the knowledge base, the Optimized infrastructure deployment planning & validation will provide degree of confidence score for feasibility of deployment, cost, time to deploy, of a requested deployment without incurring cost and Save cost liabilities related to failed or partial deployments that result in rollback, causing deployment & invoicing of rolled back services
723

Up-front inspection of the Cloud IaC using any validation methods such as Security validation and runtime analysis and static analysis etc using Tfsec, TFvalidate, TFlint etc.. which will help end user to deploy validated and robust patterns comprising of pre validated services and services, across service providers, or better still, be able to advice end users of which services the end user should prefer in the chaining sequence that is being attempted by the said end user
724

Dynamic and real time pricing of certain service from service providers to be able to ascertain service pricing up front, before actual service deployment
725

Real time availability of a service based on APIs provided by service provider(s) which can ascertain service deployment success ( for example in certain region )
726

Composer chaining advisory and recommendation engine

Data Gathering Phase

1) Service Metadata: it includes descriptions of services that provide information about their meaning and purpose. We also collect information about service attributes such as inputs and outputs which reveal details about service dependencies and any other relevant data.

2) User Profile: We collect user-specific information such as demographics, preferences, historical usage patterns and any other relevant data. This data gives us insights into the behaviour of customer accounts utilising cloud services, helping us to personalize recommendations accordingly.

810

Data Pre-processing and Normalization

Standardize the text to ensure consistency as text data is collected from different providers may have variations in formatting or writing styles. We remove stop words, special Characters that do not carry significant meaning in the context of the analysis. We normalize text by converting words to their base or root form.

820

Embedding Encoder

Encode the pre-processed and normalized data into embeddings. These embeddings capture the characteristics of each service, its attributes, and the user profile in a lower-dimensional vector space. Following embedding vectors are generated as part of this process.

1) Attribute Embeddings: Each attribute of a service is represented as a vector known as an attribute embedding. These embeddings are generated by using pretrained transformer model, wherein the pre-processed and normalized textual descriptions of attributes are passed as input. The resulting embeddings capture the semantic meaning and contextual understanding of the service attributes. We further fine tune these embeddings using known relationships between input and output attributes.

2) Service Embeddings: Each service is represented as a vector known as a service embedding. We propose to use GNN (aka Graph Neural Network) to train and refine these embeddings. The model uses known service dependencies as the objective for optimization. By predicting the existence of relationships or dependencies between services, the embeddings are updated through backpropagation, thus adjusting the embedding vectors. The training process continues iteratively until the embeddings converge or reach a satisfactory level of accuracy.

3) User Embeddings: Each user is represented as a vector known as a user embedding. We can train a separate neural network based on user interactions with services to learn these user embeddings. Through training iterations, the user embeddings are updated to optimize for objectives such as accurate service prediction.

830

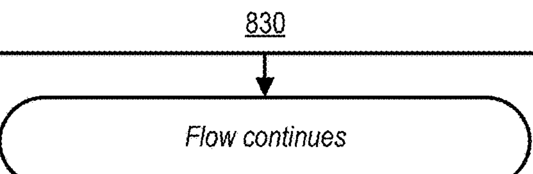

FIG. 8

Composer chaining advisory and recommendation engine, continued (validation/compatibility inference, prerequisite identification, and recommendation for a compatible service)

Compatibility Inference

To assess compatibility between services, we can calculate the average of attribute embeddings for each service. This is done by taking the mean along the embedding dimensions resulting in a single vector representing the averaged attribute embedding for the service. By comparing the average attribute embeddings, we evaluate the similarity between services based on their attribute characteristics. A similarity metric such as cosine similarity is used to measure the similarity. If the similarity score exceeds a certain threshold, we consider two services to be compatible. Let's assume we have two services Service A and Service B, and attribute embeddings represented as vectors A and B respectively:

1. Calculating the average attribute embeddings:
   The average attribute embedding for Service A: $AvgA = (1/n) * \Sigma(A[i])$ for $i = 1$ to $n$.
   The average attribute embedding for Service B: $AvgB = (1/n) * \Sigma(B[i])$ for $i = 1$ to $n$.
2. Evaluating compatibility between services:
   $CosSim = (AvgA \cdot AvgB) / (||AvgA|| \cdot ||AvgB||)$
3. Determining compatibility
   If $CosSim > Threshold$, then Service A and Service B are considered compatible.

910

Pre-requisite Identification

To determine if one service is a prerequisite for another, we compare the attribute embeddings of services. Embeddings are generated for each attribute of a service, capturing their meaning for comparison. By comparing the similarity between the output attributes of one service and the input attributes of others using metrics like cosine similarity, we check the similarities. If the similarity score exceeds a predefined threshold, it indicates a prerequisite relationship. Prior to comparing attribute embeddings, they are filtered based on relevance to reduce the search space.

920

Recommendations

1. Similar Service Recommendation

Service embeddings capture the latent features of services, helping us find similar services based on their embeddings. By calculating similarity scores, we identify the most similar services and suggest them as recommendations. We can also apply filters to tailor recommendations to user preferences or constraints. Let's consider a service A for which we want to find similar services. We select service B with high similarity scores (Sim(A, B)) as similar services to A.

$$Sim(A, B) = (Emb(A) \cdot Emb(B)) / (||Emb(A)|| \cdot ||Emb(B)||)$$

2. Personalized Recommendation

To provide personalized recommendations, we use the embeddings of services and users. First, we generate a set of candidate services based on user preferences and behaviour. Then, we retrieve the user's embedding and calculate the similarity between the user embedding and the embeddings of the candidate services using the dot product. The services are ranked based on their similarity scores and the top-k most similar services are selected as recommendations.

The personalized recommendation are expressed as: $Sim(U, S) = Emb(U) \cdot Emb(S)$
Where Emb(U) & Emb(S) are embeddings of user and service respectively. We rank services based on similarity scores (Sim(U, S)), and select the top-k most similar services as recommendations for the user.

AI BASED SERVICE COMPOSER ADVISORY FOR COMPLEX PUBLIC CLOUD SERVICES

BACKGROUND

Cloud-based service chaining refers to the integration and sequential execution of multiple connected services and applications within a cloud environment. This approach leverages the flexibility and scalability of cloud computing to create dynamic and adaptable composite service depicting an application. Service chaining involves coordination of various services, such as Network, Compute, Storage, Database, Security services etc., which are linked together in a predefined order to process network traffic. These functions are typically deployed as complex composite patterns or containerized applications, enabling rapid deployment and scaling in response to varying application demands. By utilizing cloud-based infrastructure, service chaining can dynamically adjust the sequence and composition of services based on real-time network conditions and policies, enhancing overall efficiency and performance of network operations.

In a cloud-based service chaining architecture, traffic flows through a series of service nodes, each performing specific tasks as defined by the service chain. This process is managed by a service orchestration layer that handles the configuration, management, and monitoring of the service chains. The orchestration layer uses policies and rules to ensure that service is routed through the appropriate sequence of services, adapting to changes in connected services topology and services availability. This approach allows for more granular control over network traffic and improves the agility of service delivery. Additionally, cloud-based service chaining can better leverage advanced features to provide more flexible and efficient network management.

SUMMARY

An approach is disclosed for training an artificial intelligence (AI) model to recommend services for a complex composite service chain in a cloud computing platform. The training uses metadata from various services provided by different service providers. The method involves inputting a first service into the trained AI model, which then suggests recommended services. These recommendations are displayed to a user, who selects one of the suggested services. The selected service is displayed as part of the service chain. The AI model then processes metadata from the selected service to provide additional service recommendations. This iterative process continues, with the AI model being further trained based on user selections to improve its recommendations.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein:

FIG. 6 is a flowchart depicting preprocessing steps taken by the AI-based service composer advisory for complex cloud services;

FIG. 7 is a continuation of the flowchart depicted in FIG. 6;

FIG. 8 is a flowchart depicting steps taken by the AI-service composer to compose chaining advise and recommendations; and FIG. 9 is a continuation of the flowchart depicted in FIG. 8.

DETAILED DESCRIPTION

Figure 1:
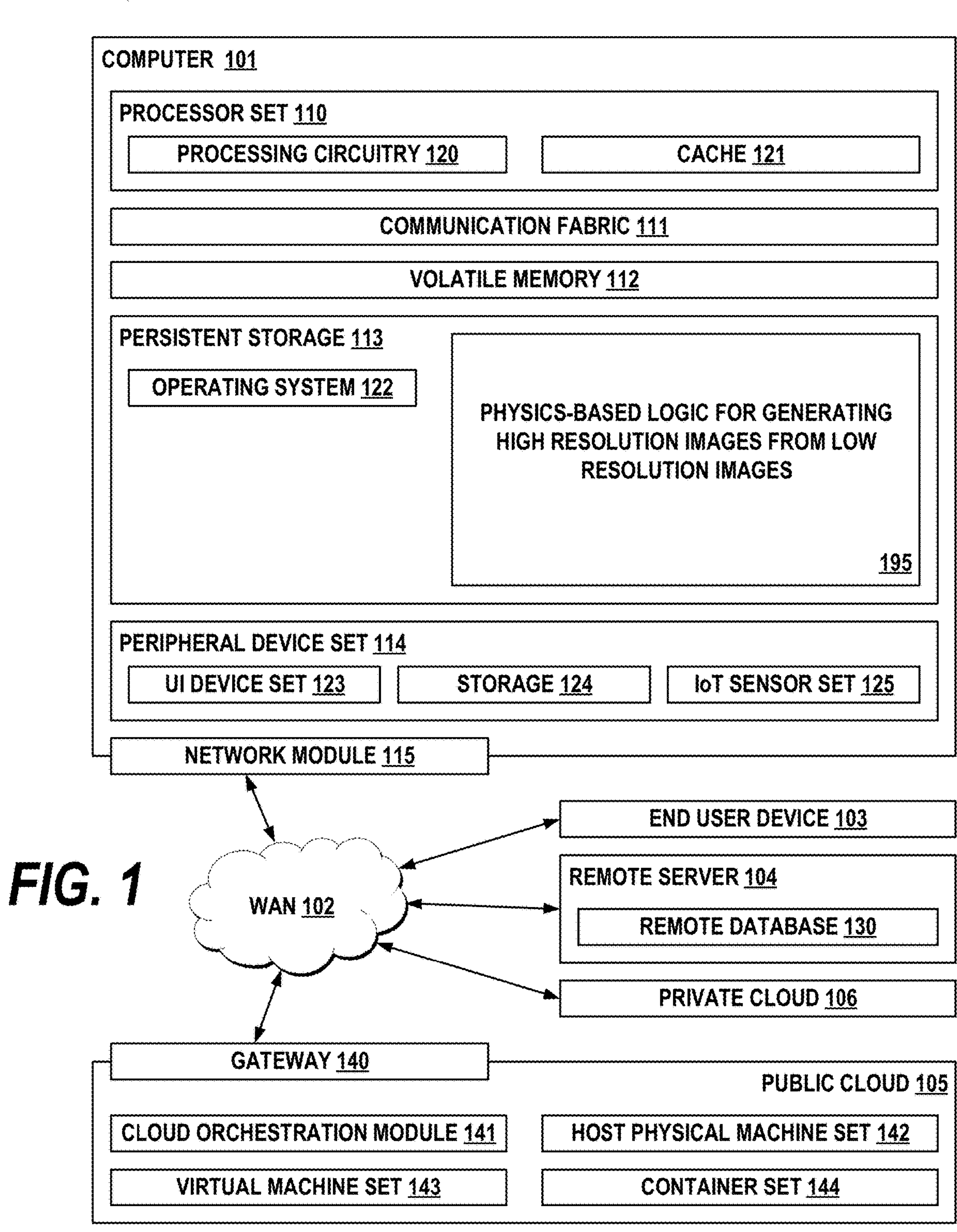
FIG. 1 is a block diagram of a data processing system in which the methods described herein can be implemented.

In the realm of continuous deployment and continuous automation, a primary challenge is automating deployment configurations and dynamically integrating the various components of the deployment process, thereby minimizing the need for manual intervention. Traditional infrastructure deployment is often managed as Infrastructure as Code (IaC), and application deployment typically involves multiple steps. Platform as a Service (PaaS) deployment frequently requires manual steps and subsequent configurations.

The approach described herein addresses the complexities of composite services or service-chaining across heterogeneous technologies, such as Terraform and Ansible, to build a complex workflow that is fully automated. Identifying the relationships between services and their respective attributes and parameters is a complicated and tedious process, which this approach effectively manages. Despite the normalization offered by templates like Hashicorp Terraform, creating a complex composite remains challenging because developers must understand the parameters, attributes, and prerequisites necessary to build an optimized composite.

This approach addresses this challenge by validating the composite from a deployment success perspective and constructing the composite using an assisted workflow. This workflow provides suggestions on possible and popular services that are typically used together, facilitating the chaining of these services. The approach manages the significant complexity introduced by dynamic changes in the usage of attributes and parameters for services.

Moreover, the approach not only enables the construction of service mashup composites but also validates whether two services can be effectively chained together, identifying any prerequisite dependencies needed for the chaining process. It offers recommendations for validated, approved, or most suitable services to chain together, ensuring the service chain construct is validated upfront. This proactive validation prevents incurring substantial costs if a service becomes unavailable during the service chain execution.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium does not include a computer readable signal medium.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 2:
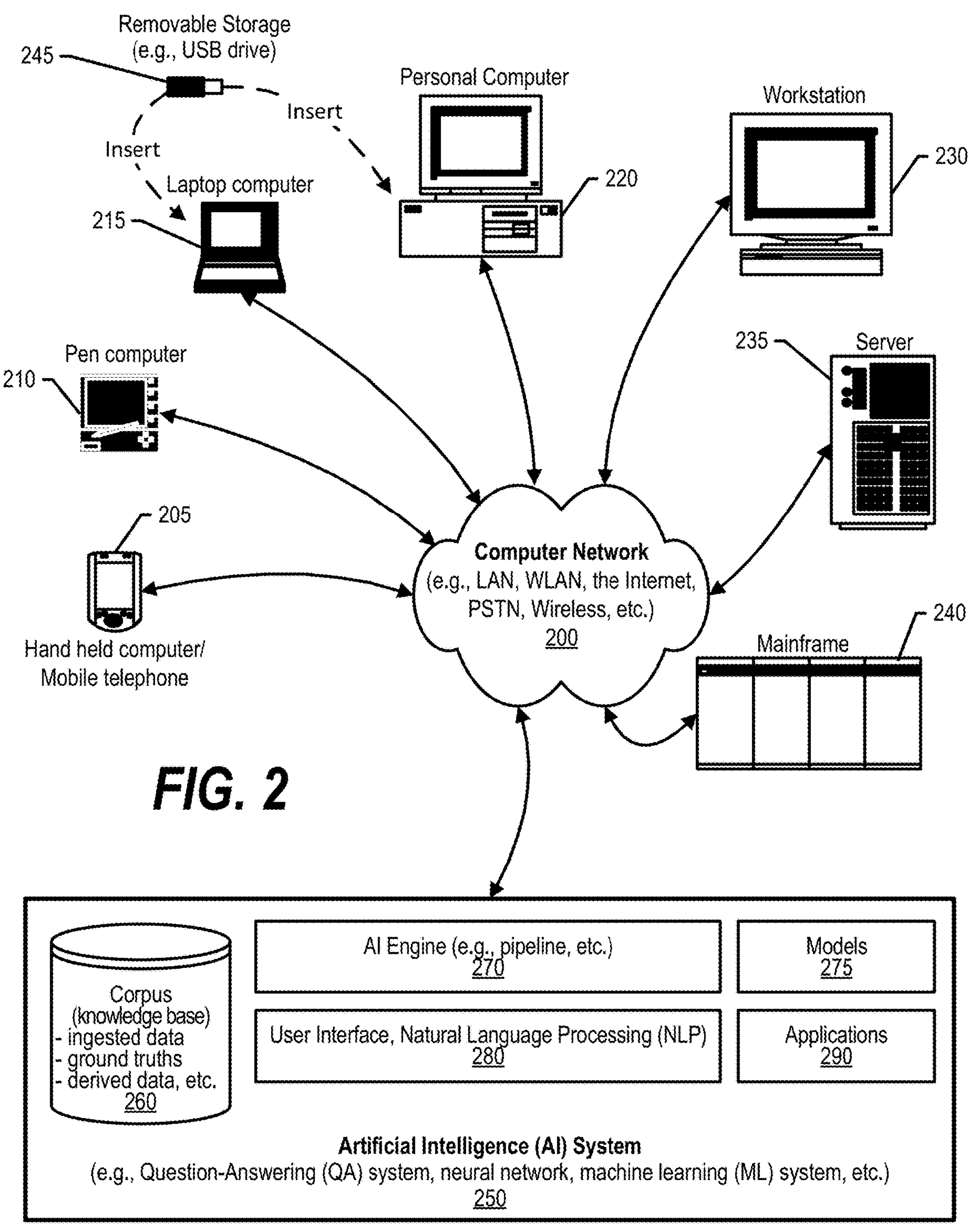
FIG. 2 provides an extension of the information handling system environment shown in FIG. 1 to illustrate that the methods described herein can be performed on a wide variety of information handling systems which operate in a networked environment.

FIG. 1 is a block diagram of a data processing system in which the methods described herein can be implemented. Computing environment 100 contains an example of an environment for the execution of at least some of the computer code involved in performing the inventive methods, such as shown in the description of block 195. In addition to block 195, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 195, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 195 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open source Portable Operating System Interface-type operating systems that employ a kernel. The code included in block 195 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

A NETWORKED ENVIRONMENT is shown in FIG. 2. The networked environment provides an extension of the information handling system shown in FIG. 1 illustrating that the methods described herein can be performed on a wide variety of information handling systems that operate in a networked environment, depicted by computer network 200. Types of computer networks can include local area networks (LANs), wide area networks (WANs), the Internet, peer-to-peer networks, public switched telephone networks (PSTNs), wireless networks, etc. Types of information handling systems range from small handheld devices, such as handheld computer/mobile telephone 205 to large mainframe systems, such as mainframe computer 240. Examples of handheld computer 205 include smart phones, personal digital assistants (PDAs), personal entertainment devices, such as MP3 players, portable televisions, and compact disc players. Other examples of information handling systems include pen, or tablet, computer 210, laptop, or notebook, computer 215, personal computer 220, workstation 230, and server computer system 235. Other types of information handling systems that are not individually shown in FIG. 2 can also be interconnected other computer systems via computer network 200.

Many of the information handling systems include nonvolatile data stores, such as hard drives and/or nonvolatile memory depicted in FIG. 1. These nonvolatile data stores and/or memory can be included, or integrated, with a particular computer system or can be an external storage device, such as an external hard drive. In addition, removable nonvolatile storage device 245 can be shared among two or more information handling systems using various techniques, such as connecting the removable nonvolatile storage device 245 to a USB port or other connector of the information handling systems.

An ARTIFICIAL INTELLIGENCE (AI) SYSTEM is depicted at the bottom of FIG. 2. Artificial intelligence (AI) system 250 is shown connected to computer network 200 so that it is accessible by other computer systems 205 through 240. AI system 250 runs on one or more information handling systems (comprising one or more processors and one or more memories, and potentially any other computing device elements generally known in the art including buses, storage devices, communication interfaces, and the like) that connects AI system 250 to computer network 200. The network 200 may include multiple computing devices 104 in communication with each other and with other devices or components via one or more wired and/or wireless data communication links, where each communication link may comprise one or more of wires, routers, switches, transmitters, receivers, or the like. AI system 250 and network 200 may enable functionality, such as question/answer (QA) generation functionality, for one or more content users. Other embodiments of AI system 250 may be used with components, systems, sub-systems, and/or devices other than those that are depicted herein.

AI system 250 maintains corpus 260, also known as a "knowledge base," which is a store of information or data that the AI system draws on to solve problems. This knowledge base includes underlying sets of facts, ground truths, assumptions, models, derived data, and rules which the AI system has available in order to solve problems. In one embodiment, a content creator creates content in corpus 260. This content may include any file, text, article, or source of data for use in AI system 250. Content users may access AI system 250 via a network connection or an Internet connection to the network 200, and, in one embodiment, may input questions to AI system 250 that may be answered by the content in the corpus of data. As further described below, when a process evaluates a given section of a document for semantic content, the process can use a variety of conventions to query it from the AI system.

AI system 250 may be configured to receive inputs from various sources. For example, AI system 250 may receive input from the network 200, a corpus of electronic documents or other data, a content creator, content users, and other possible sources of input. In one embodiment, some or all of the inputs to AI system 250 may be routed through the network 200. The various computing devices on the network 200 may include access points for content creators and content users. Some of the computing devices may include devices for a database storing the corpus of data. The network 200 may include local network connections and remote connections in various embodiments, such that AI system 250 may operate in environments of any size, including local and global, e.g., the Internet. Additionally, AI system 250 serves as a front-end system that can make available a variety of knowledge extracted from or represented in documents, network-accessible sources and/or structured data sources. In this manner, some processes populate the AI system with the AI system also including input interfaces to receive knowledge requests and respond accordingly.

AI Engine 270, such as a pipeline, is an interconnected and streamlined collection of operations. The information works its way into and through a machine learning system, from data collection to training models. During data collection, such as data ingestion, data is transported from multiple sources, such as sources found on the Internet, into a centralized database stored in corpus 260. The AI system can then access, analyze, and use the data stored in its corpus.

Models 275 are the result of AI modeling. AI modeling is the creation, training, and deployment of machine learning algorithms that emulate logical decision-making based on the data available in the corpus with the system sometimes utilizing additional data found outside the corpus. AI models

275 provide AI system 250 with the foundation to support advanced intelligence methodologies, such as real-time analytics, predictive analytics, and augmented analytics.

User interface 280, such as Natural Language (NL) Processing (NLP) is the interface provided between AI system 200 and human uses. Semantic content is content based on the relation between signifiers, such as words, phrases, signs, and symbols, and what they stand for, their denotation, or connotation. In other words, semantic content is content that interprets an expression, such as by using NLP. Semantic data is stored as part of corpus 260. In one embodiment, the process sends well-formed questions (e.g., natural language questions, etc.) to the AI system. AI system 250 may interpret the question and provide a response to the content user containing one or more answers to the question. In some embodiments, AI system 250 may provide a response to users in a ranked list of answers. Other types of user interfaces (UIs) can also be used with AI system 250, such as a command line interface, a menu-driven interface, a Graphical User Interface (GUI), a Touchscreen Graphical User Interface (Touchscreen GUI), and the like.

AI applications 290 are various types of AI-centric applications focused on one or more tasks, operations, or environments. Examples of different types of AI applications include search engines, recommendation systems, virtual assistants, language translators, facial recognition and image labeling systems, and question-answering (QA) systems.

In some illustrative embodiments, AI system 250 may be a question/answering (QA) system, which is augmented with the mechanisms of the illustrative embodiments described hereafter. A QA type of AI system 250 may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the I QA system. The statistical model may then be used to summarize a level of confidence that the QA system has regarding the evidence that the potential response, i.e. candidate answer, is inferred by the question. This process may be repeated for each of the candidate answers until the QA system identifies candidate answers that surface as being significantly stronger than others and thus, generates a final answer, or ranked set of answers, for the input question.

Figure 3:
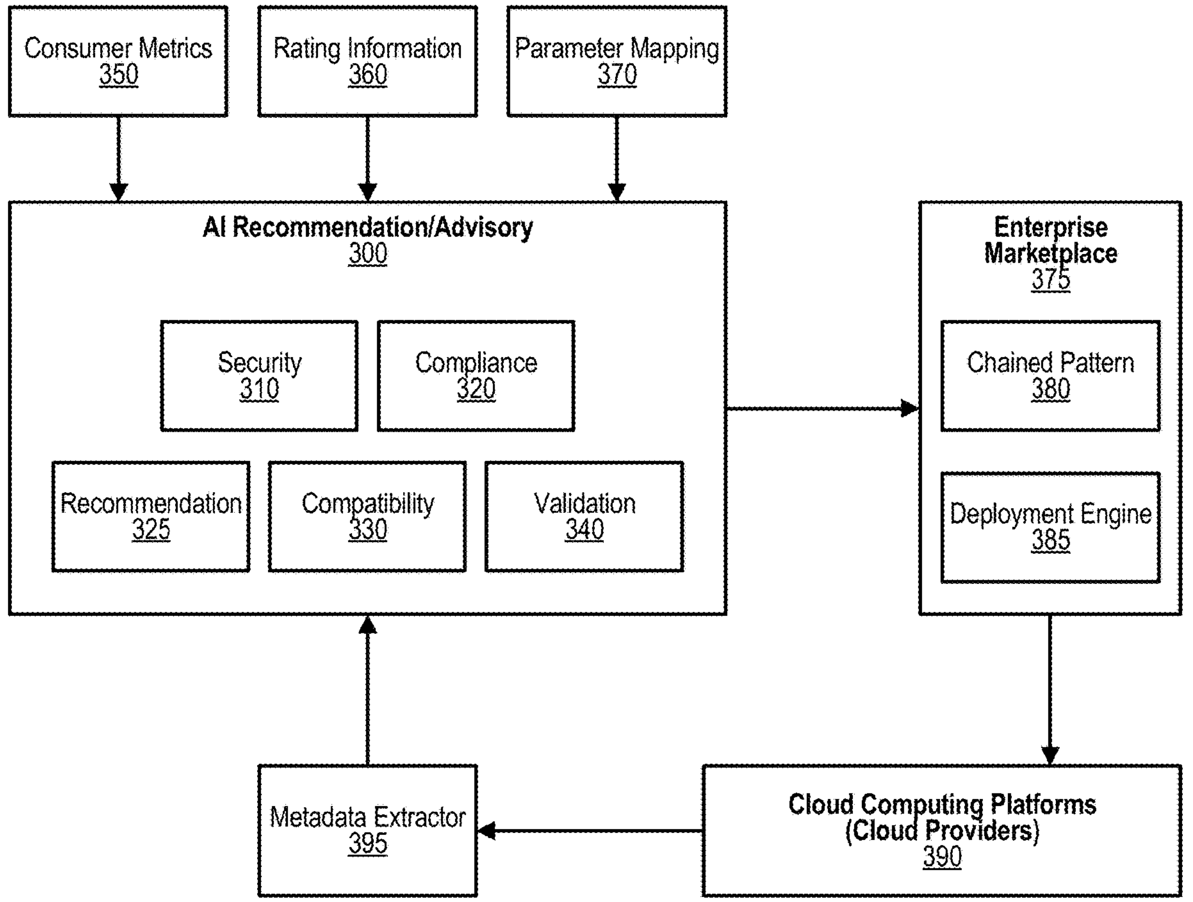
FIG. 3 is a component diagram depicting the components used in service composing and chaining using AI recommendations and advice.

FIG. 3 is a component diagram depicting the components used in service composing and chaining using AI recommendations and advice. The Artificial Intelligence (AI) Recommendation/Advisory Engine 300 is a sophisticated system designed to provide recommendations and advice based on a variety of inputs and components. The AI Recommendation/Advisory Engine 300 comprises five main components: the security component 310, the compliance component 320, the recommendation component 325, the compatibility component 330, and the validation component 340. These components work in tandem to analyze input data and generate actionable insights.

The security component 310 ensures that all recommendations adhere to security protocols and standards such as policy compliance and data residency compliance. The compliance component 320 verifies that the recommendations align with regulatory and policy requirements. The policy security and compliance modules ensure that the services from public cloud providers being service chained are secure for use and compliant with the end user's organizational compliance norms. For instance, data residency policies for certain organizations may mandate that their data cannot leave their country or sometimes even their city/province. The AI module in the proposed solution will perform upfront checks against these compliance norms or policies for the services chosen for service chaining to ensure that deployment does not fail, thus saving substantial cost and time for end users and preventing the hassles of non-compliance and potential legal penalties. Given the large number of cloud service providers in the market, the proposed AI engine performs upfront validation using tools such as Kics, TFsec, TFvalidate, etc., for both orchestration scripts (such as Ansible) and Infrastructure as Code (IaC) templates (such as Terraform), ensuring the security of the overall chained solution.

The recommendation component 325 synthesizes service metadata, user profiles, and usage patterns to provide personalized service suggestions. The compatibility component 330 checks the compatibility of recommended services with existing systems. The validation component 340 ensures the feasibility and accuracy of the service chains through prerequisite identification and deployment success validation.

The AI Recommendation/Advisory Engine 300 receives several inputs to compute its recommendations and advice. These inputs include consumer metrics 350, which provide data on user behavior and preferences, rating information 360, which offers feedback and evaluations of services or products, and parameter mapping 370, which maps various parameters to ensure accurate and relevant recommendations. Additional inputs provided to the AI module include cloud providers, provider services, service attributes, service arguments, attribute and argument descriptions, and dependencies between services.

The AI Recommendation/Advisory Engine 300 interfaces with the Enterprise Marketplace 375, which includes chained patterns of services (service chains) 380 and a Deployment Engine 385 that deploys these service-chained patterns onto Cloud Computing Platforms 390. These cloud computing platforms can encompass a wide range of public cloud-based as well as private cloud providers. The Metadata Extractor process 395 is responsible for extracting metadata from these providers and providing the extracted metadata as an input to the AI Recommendation/Advisory Engine 300. The Metadata Extractor process 395 extracts metadata such as service parameters, attributes, dependencies, and other relevant information from these cloud providers. This metadata is crucial for refining the recommendations and ensuring that they are tailored to the specific configurations and capabilities of the cloud-based platforms.

Figure 4:
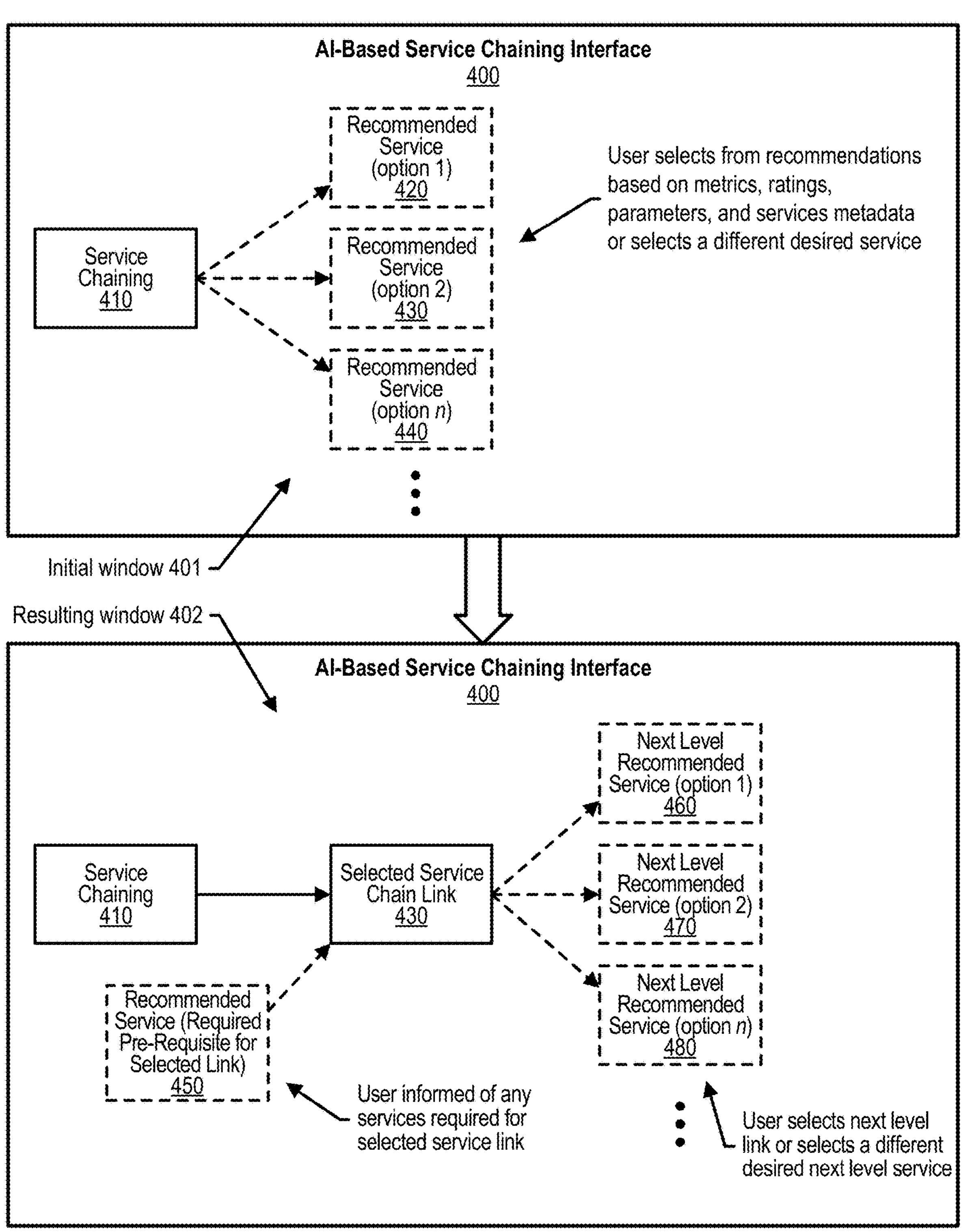
FIG. 4 is a user-interface diagram depicting a user selecting from recommendations to add links to a service chain.

FIG. 4 is a user-interface diagram depicting a user selecting from recommendations to add links to a service chain. The AI-Based Service Chaining Interface 400 is a graphical user interface (GUI) designed for users to interact with an AI system to select and build complex composite patterns and chained solutions for cloud computing platforms offered by Cloud Computing providers. The interface provides an intuitive means for users to construct complex service chains with AI-driven recommendations and validations.

Upon accessing the AI-Based Service Chaining Interface 400, the user is presented with an initial window 401. This initial window 401 displays the user's current service chaining construct or pattern 410. The AI component of the interface suggests compatible services that can be effectively integrated with the existing service chained pattern 410. These recommended service constructs include cloud provider services 420, 430, and 440. The user can review these recommendations and can also bring a new service to the service chaining pattern, even if that is not provided as a recommendation. Using the advisory recommendations is optional and is not a mandate. In this scenario, the user has chosen service chain link option 430.

Following the user's selection, a resulting window 402 appears. In this resulting window 402, the selected service 430 is added as the next service in the user's evolving service chained pattern. The AI-based engine then analyzes the newly updated service chain and presents additional recommended services that can follow the newly integrated service chained pattern 430. These recommendations include services 460, 470, and 480. Furthermore, the AI identifies and displays a prerequisite service 450 that is essential for the proper integration, optimized infrastructure deployment, and deployability with utmost confidence without leading to unnecessary costing of the selected service 430.

In a manner similar to the initial window 401, the user can select additional services from the resulting window 402 to continue building the service chained pattern. This process involves the user selecting the identified prerequisite service 450 and choosing one of the subsequent services (460, 470, or 480) to further extend the service chain. The AI-Based Service Chaining Interface ensures the pre-validation of services, dynamic validation of any changes in the services being offered by public cloud providers, dynamic pricing, and the presentation of the overall price of the chained construct upfront, well before deployment of this complex composite construct. The interface also handles caching a service, ensuring that the service chaining pattern is deployable.

The AI-Based Service Chaining Interface 400 thus facilitates a seamless and automated process for constructing complex service chains by providing users with AI-generated recommendations, ensuring compatibility and fulfilling necessary prerequisites, thereby optimizing the deployment and configuration of services on cloud computing platforms.

Figure 5:
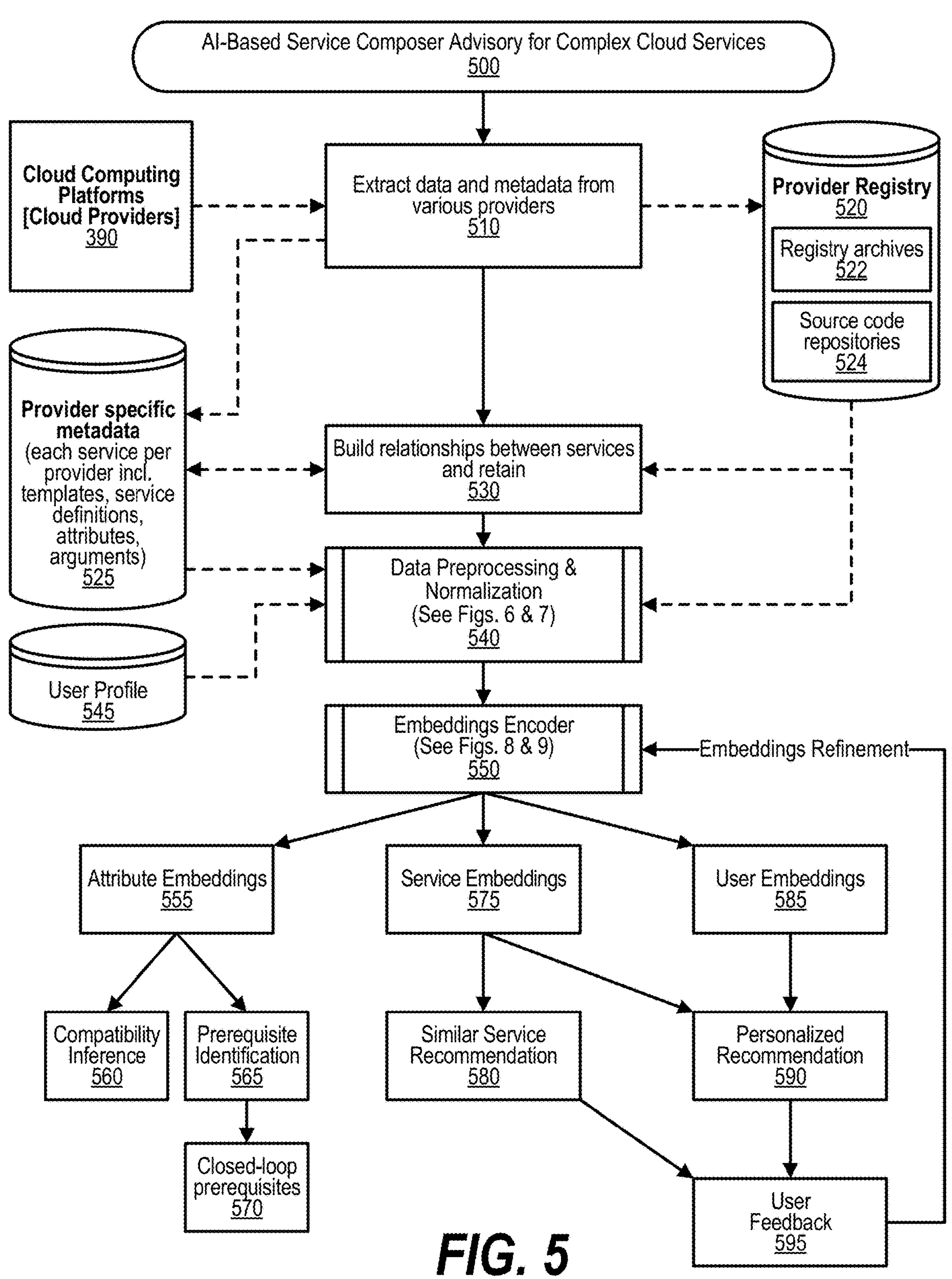
FIG. 5 is a flowchart depicting steps taken by an AI-based service composer advisory for complex cloud services.

FIG. 5 illustrates the processing steps for an AI-Based Service Composer Advisory for Complex Cloud Services, commencing at step 500. The initial step 510 involves extracting data and metadata from various cloud providers, specifically from cloud computing platforms 390. This data is subsequently stored in the provider registry data store 520, which includes registry archives data 522 and source code repositories data 524. Additionally, provider-specific metadata, encompassing each service per provider, provider-specific service templates, service definitions, attributes, and arguments, is stored in data store 525.

Following data extraction and storage, the process at step 530 builds relationships between services, updating data store 525 and utilizing data retrieved from data store 520 to retain this relational data. At predefined process 540, the Data Preprocessing and Normalization routine is executed, as detailed in FIGS. 6 and 7. This routine retrieves data from data stores 520 and 525, as well as user profile data from data store 545.

Subsequently, at predefined process 550, the process performs the Embeddings Encoder routine, as described in FIGS. 8 and 9. At step 555, the attribute embeddings process is carried out, encompassing compatibility inference processing 560 and prerequisite identification processing 565. The prerequisite identification process includes closed-loop prerequisite processing 570 to ensure comprehensive analysis.

At step 575, the service embeddings process takes place, incorporating similar service recommendation processing 580. This step is followed by the user embeddings process at step 585, which includes personalized recommendation processing 590. The personalized recommendation process also receives input from the service embeddings process 575 to enhance recommendation accuracy.

User feedback is incorporated at step 595, allowing the user to provide input and possible embeddings refinements. If any embeddings are refined, the process loops back to predefined process 550 to repeat the Embeddings Encoder routine as outlined in FIGS. 8 and 9. This iterative feedback loop ensures continuous improvement and optimization of the AI-Based Service Composer Advisory system for complex cloud services.

FIGS. 6 and 7 depict a flowchart of preprocessing steps taken by the AI-based service composer advisory for complex cloud services. At step 601, the proposed invention will automatically discover all Cloud providers, for example, Terraform providers, at a certain frequency, such as hourly or daily (ideally once every three days), to detect and discover available and archived providers at that point in time. At step 602, the process detects the number of available providers, which may be fewer than the registered providers; in such cases, these providers may no longer be supported or usable. At step 603, the process extracts source code repository information for all available Terraform providers and extracts minimal viable configuration for the provider from the Terraform registry.

At step 604, a file system is created with multiple minimal cloud provider Infrastructure as a Code (IaC) template files for each provider, including a minimum schema for each provider (such as AWS). Considering Terraform as the IaC technology, at step 605, the process performs schema inspection to discover all available properties for the provider block, its arguments, services, data sources, and their configuration arguments, attribute types, and specifications for each argument. At step 606, for each service's argument, the above inspection does not provide information on whether it is optional or mandatory for the configuration of the service. Therefore, for each provider, the process detects and ingests the source code repository of the provider, locates the appropriate location where the raw provider documentation files are located, and parses these to deduce if the arguments and attributes are required or optional. This dynamic discovery avoids hard-coded references, ensuring the information is always current for the specific provider's implementation.

At step 607, for each service, the process discovers the attributes that will be present on instances of the service after it is deployed or provisioned, such as IDs, names, or other provider-specific metadata. At step 608, all providers, services, data sources, their metadata, data types, configurations, and dependencies are available for all input configuration arguments and output attributes. A graph model is constructed for the metadata and dependencies, which is then available for use in the assisted composite builder.

At step 609, the frequency of association of data sources and services across cloud service providers and multiple services within a certain service provider, with other data sources and services, is mapped into a dependency graph model and persisted. At step 610, all source code repositories available for IaC standards, partner or OEM Terraform templates or modules are detected, and all available modules are exhaustively discovered and parsed. The same dependency discovery and mapping performed in steps 607, 608, and 609 are executed, and the graph model and dependency graph model are constructed and persisted for use in the assisted composite builder.

At step 612, the system augments the metadata of all templates and constructs a pattern, which is a packaged definition of the template, its metadata, other metadata generated by the system, and the visual representation of all services, data sources, and patterns. At step 613, after all the graph models have been persisted, the system provides a scriptable or graphical user interface that allows the user to view existing deployment patterns automatically discovered and generated by the system.

At step 614, the user can view other patterns defined by themselves or other users in their team, group, or business organization. They can select a specific pattern or define a new pattern from scratch. For any existing patterns, the user can extend or modify them manually or using an assisted mode. The user will also be shown the subset of all other services and data sources from providers that resolve dependencies for existing services in the pattern, suitable for integration into the pattern.

At step 615, for any existing patterns, the user is shown recommendations of other patterns that provide resolution for dependencies in other patterns, suitable for integration. At step 616, if the user selects the assist mode, the system will show validation, dependencies, and recommendations of other services that provide resolution for dependencies of existing services in the pattern, suitable for integration into the pattern. The assist mode also provides recommendations on services the user may add to the existing pattern to achieve a desired level of completeness for the target deployment. If the user does not wish to use a certain service with optional additional configuration, they will be shown recommendations of the required and mandatory configuration to select the appropriate set for their use case.

At step 617, the user can override the values of any existing attribute based on their need for a specific configuration. The override is stored as metadata supplementing the existing value of the attribute without removing the original. The user can store and persist a set of overrides as a configuration set and define multiple configuration sets. At step 618, when the user selects, they can use graphical means to select new services, data sources, or patterns and include them in the existing visual representation of the pattern. Using these steps, the user can define their required service and service deployment topology as a single entity (pattern) that can be repeatedly reused for multiple deployments.

At step 719, governance orchestration using Policy as Code is suggested to orchestrate a pipeline for resiliency and self-healing and to make decisions in case of deployment failure of part of the service chain at the time of provisioning. For instance, if the provisioning of the third service in the service chain fails, it can attempt to redeploy the service a few times, and if repeated failures occur, manual intervention can be invoked, or a decision can be made to decommission everything provisioned in the front part of the service chain to reset. These decisions can be written in an OPA-like policy engine and attached as an orchestration engine to the proposed service chaining.

At step 720, optimized infrastructure deployment planning and validation will continually monitor the provider to retrieve and cross-correlate state, metadata, and configuration of all services and configurations for the provider, including all regions, data centers, availability zones, network uplinks and downlinks, and their availability. This creates a virtual representation of the provider, complete with the metadata and topology of all services that exist at the provider, using event-based or poll-based methods to synchronize changes at the provider.

At step 721, optimized infrastructure deployment planning and validation create a knowledge base of dependencies and multivariate correlation of state, metadata, and configuration of various services across cloud providers to delineate application-specific, business service classification, organization, or hierarchy applied to the hierarchical topology as seen fit by the user for their business use. At step 722, to ensure that the requested services are not lost or removed during the deployment, the optimized infrastructure deployment planning and validation will reserve or clone any services that the provider supports creating perfect copies of and reserve those that the provider allows to reserve, dynamically persisting them until the projected overall deployment latency, to ensure successful provisioning. These persisted clones will undergo provisioning compliance to cater to vulnerability, compliance, and security considerations.

At step 723, based on the knowledge base, optimized infrastructure deployment planning and validation provide a degree of confidence score for the feasibility of deployment, cost, and time to deploy without incurring costs and saving cost liabilities related to failed or partial deployments that result in rollback, causing deployment and invoicing of rolled-back services. At step 724, upfront inspection of the Terraform IaC is performed using validation methods such as security validation, runtime analysis, and static analysis using tools like Tfsec, TFvalidate, and TFlint. This helps end users deploy validated and robust patterns comprising pre-validated services across service providers and advise end users on which services to prefer in the chaining sequence they are attempting.

At step 725, dynamic and real-time pricing of certain services from service providers is provided to ascertain service pricing upfront before actual service deployment. At step 726, real-time availability of a service is determined based on APIs provided by service providers to ascertain service deployment success, such as in a specific region.

FIGS. 8 and 9 depict a flowchart showing the steps taken by the AI-service composer to compose chaining advice and recommendations. At step 810, the process performs the Data Gathering Phase, which involves gathering two types of data. The first type is Service Metadata, which includes descriptions of services that provide information about their meaning and purpose. This also involves collecting information about service attributes such as inputs and outputs, revealing details about service dependencies and any other relevant data. The second type of data is User Profile Data, which involves collecting user-specific information such as demographics, preferences, historical usage patterns, and any other relevant data. This data provides insights into the behavior of customer accounts utilizing cloud services, facilitating personalized recommendations.

At step 820, the process performs Data Pre-processing and Normalization, which standardizes the text to ensure consistency, as text data collected from different providers may have variations in formatting or writing styles. This step removes stop words and special characters that do not carry significant meaning in the context of the analysis and normalizes the text by converting words to their base or root form.

At step 830, the process performs the Embedding Encoder, which encodes the pre-processed and normalized data into embeddings. These embeddings capture the characteristics of each service, its attributes, and the user profile in a lower-dimensional vector space. The embedding encoder generates three types of data:

1. Attribute Embeddings: Each attribute of a service is represented as a vector known as an attribute embedding. These embeddings are generated using a pre-trained transformer model, wherein the pre-processed and normalized textual descriptions of attributes are inputted. The resulting embeddings capture the semantic meaning and contextual understanding of the service attributes. These embeddings are further fine-tuned using known relationships between input and output attributes.
2. Service Embeddings: Each service is represented as a vector known as a service embedding. A Graph Neural Network (GNN) is proposed to train and refine these embeddings. The model uses known service dependencies as the objective for optimization. By predicting the existence of relationships or dependencies between services, the embeddings are updated through back-propagation, thus adjusting the embedding vectors iteratively until they converge or reach a satisfactory level of accuracy.
3. User Embeddings: Each user is represented as a vector known as a user embedding. A separate neural network, based on user interactions with services, is trained to learn these user embeddings. Through training iterations, the user embeddings are updated to optimize for objectives such as accurate service prediction.

At step 910, the process performs the Compatibility Inference, which assesses compatibility between services by calculating the average of attribute embeddings for each service. This involves taking the mean along the embedding dimensions, resulting in a single vector representing the averaged attribute embedding for the service. By comparing these average attribute embeddings using a similarity metric such as cosine similarity, the similarity between services based on their attribute characteristics is evaluated. If the similarity score exceeds a certain threshold, the services are considered compatible. The compatibility is determined as follows:

1. Calculate the average attribute embeddings for Service A and Service B:

$$AvgA=(1/n)*\Sigma(A[i]) \text{ for } i=1 \text{ to } n.$$

$$AvgB=(1/n)*\Sigma(B[i]) \text{ for } i=1 \text{ to } n.$$

2. Evaluate compatibility between services using cosine similarity:

$$-\text{Cos Sim}=(AvgA\cdot AvgB)/(\|AvgA\|\cdot\|AvgB\|).$$

3. Determine compatibility:
   If CosSim>Threshold, Service *A* and Service *B* are considered compatible.

At step 920, the process performs the Pre-requisite Identification, which determines if one service is a prerequisite for another by comparing the attribute embeddings of services. Each attribute's embeddings capture their meaning for comparison. Similarity between the output attributes of one service and the input attributes of others is checked using metrics like cosine similarity. If the similarity score exceeds a predefined threshold, it indicates a prerequisite relationship. Before comparing attribute embeddings, they are filtered based on relevance to reduce the search space.

At step 930, the process performs the Recommendations, which comprises two parts:

1. Similar Service Recommendation: Service embeddings capture the latent features of services, aiding in finding similar services based on their embeddings. By calculating similarity scores, the most similar services are identified and suggested as recommendations. Filters can be applied to tailor recommendations to user preferences or constraints. For example, for a service A, similar services with high similarity scores (Sim(A, B)) are selected:

$$-\text{Sim}(A,B)=(Emb(A)\cdot Emb(B))/(\|Emb(A)\|\cdot\|Emb(B)\|).$$

2. Personalized Recommendation: to provide personalized recommendations, the embeddings of services and users are used. A set of candidate services is generated based on user preferences and behavior. The user's embedding is then retrieved, and the similarity between the user embedding and the embeddings of the candidate services is calculated using the dot product. Services are ranked based on their similarity scores, and the top-k most similar services are selected as recommendations:
   Sim(U, S)=Emb(U). Emb(S), where Emb(U) and Emb (S) are the embeddings of the user and the service, respectively. Services are ranked based on similarity scores (Sim(U, S)), and the top-k most similar services are selected as recommendations for the user.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method, implemented by a processor coupled to a memory, comprising:

training an artificial intelligence (AI) model to recommend a plurality of services to link to a complex composite service chain forming an application solution in a cloud computing platform, wherein the training inputs metadata corresponding to a plurality of services provided by a plurality of service providers;

ingesting a first service to the trained AI model and responsively receiving a first plurality of recommended services from the trained AI model, wherein the first plurality of recommended services is displayed to a user;

receiving a user selection of one of the first plurality of recommended services;

displaying the selected service as a link in the complex composite service chain;

ingesting, to the trained AI model, metadata corresponding to the selected service and responsively receiving a second plurality of recommended services, wherein the second plurality of recommended services are displayed to the user;

further training the trained AI model using the user selection;

constructing the trained AI model using the plurality of service providers, a plurality of resource types, a plurality of configurations, and a plurality of dependencies;

mapping a frequency of association of data sources and corresponding resource types across the plurality of service providers; and augmenting a metadata of templates and constructing a complex composite service chained pattern, the complex composite service chained pattern being a packaged definition of the templates representing a complex application, wherein the complex composite service chained pattern is displayable in a graphical user interface.

2. The method of claim 1 further comprising:

receiving, from the trained AI model, a prerequisite service that corresponds to the selected service; and displaying the prerequisite service and depicting a visual link between the selected service and the prerequisite service.

3. The method of claim 1 wherein the training and further training further comprises:

inputting a plurality of consumer metrics, a plurality of rating information, and a plurality of parameter mappings to the trained AI model; and inputting a plurality of user profile data to the trained AI model.

4. The method of claim 1 further comprising:

training the trained AI model on a plurality of aspects regarding the plurality of services provided by the plurality of service providers, wherein the plurality of aspects includes security aspects, compliance aspects, recommendation aspects, compatibility aspects, interdependency aspects, deployment aspects, data residency aspects, pre-requisites needed, dynamic pricing aspects, service availability aspects, and validation aspects.

5. The method of claim 1 further comprising:

discovering the plurality of service providers corresponding to the plurality of services.

6. The method of claim 1 further comprising:

gathering data that includes a service metadata and a user profile data;

preprocessing and normalizing a plurality of data received from a plurality of service providers of the plurality of services; and encoding the preprocessed and normalized data into embeddings, wherein the embeddings include attribute embeddings, service embeddings, and user embeddings.

7. The method of claim 1 further comprising:

assessing a compatibility between the plurality of services;

identifying one or more prerequisite services that correspond to at least one of the plurality of services; and recommending the first plurality of recommended services, wherein the recommending includes a compatible service recommendation and a personalized recommendation of further services which are compatible with the selected service and can be chained together to form an assured deployable pattern.

8. An information handling system comprising:

one or more processors;

a memory coupled to at least one of the processors; and a set of instructions stored in the memory and executed by at least one of the processors to perform actions comprising:

training an artificial intelligence (AI) model to recommend a plurality of services to link to a complex composite service chain forming an application solution in a cloud computing platform, wherein the training inputs metadata corresponding to a plurality of services provided by a plurality of service providers;

ingesting a first service to the trained AI model and responsively receiving a first plurality of recommended services from the trained AI model, wherein the first plurality of recommended services is displayed to a user;

receiving a user selection of one of the first plurality of recommended services;

displaying the selected service as a link in the complex composite service chain;

ingesting, to the trained AI model, metadata corresponding to the selected service and responsively receiving a second plurality of recommended services, wherein the second plurality of recommended services are displayed to the user;

further training the trained AI model using the user selection;

constructing the trained AI model using the plurality of service providers, a plurality of resource types, a plurality of configurations, and a plurality of dependencies;

mapping a frequency of association of data sources and corresponding resource types across the plurality of service providers; and augmenting a metadata of templates and constructing a complex composite service chained pattern, the complex composite service chained pattern being a packaged definition of the templates representing a complex application, wherein the complex composite service chained pattern is displayable in a graphical user interface.

9. The information handling system of claim 8 wherein the actions further comprise:

receiving, from the trained AI model, a prerequisite service that corresponds to the selected service; and displaying the prerequisite service and depicting a visual link between the selected service and the prerequisite service.

10. The information handling system of claim 8 wherein the training and further training further comprises:

inputting a plurality of consumer metrics, a plurality of rating information, and a plurality of parameter mappings to the trained AI model; and inputting a plurality of user profile data to the trained AI model.

11. The information handling system of claim 8 wherein the actions further comprise:

training the trained AI model on a plurality of aspects regarding the plurality of services provided by the plurality of service providers, wherein the plurality of aspects includes security aspects, compliance aspects, recommendation aspects, compatibility aspects, interdependency aspects, deployment aspects, data residency aspects, pre-requisites needed, dynamic pricing aspects, service availability aspects and validation aspects.

12. The information handling system of claim 8 wherein the actions further comprise:

discovering the plurality of service providers corresponding to the plurality of services.

13. The information handling system of claim 8 wherein the actions further comprise:

gathering data that includes a service metadata and a user profile data;

preprocessing and normalizing a plurality of data received from a plurality of service providers of the plurality of services; and encoding the preprocessed and normalized data into embeddings, wherein the embeddings include attribute embeddings, service embeddings, and user embeddings.

14. The information handling system of claim 8 wherein the actions further comprise:

assessing a compatibility between the plurality of services;

identifying one or more prerequisite services that correspond to at least one of the plurality of services; and recommending the first plurality of recommended services, wherein the recommending includes a compatible service recommendation and a personalized recommendation of further services which are compatible with the selected service and can be chained together to form an assured deployable pattern.

15. A computer program product comprising:

a computer readable storage medium comprising a set of computer instructions that, when executed by a processor, are effective to perform actions comprising:

training an artificial intelligence (AI) model to recommend a plurality of services to link to a complex composite service chain forming an application solution in a cloud computing platform, wherein the training inputs metadata corresponding to a plurality of services provided by a plurality of service providers;

ingesting a first service to the trained AI model and responsively receiving a first plurality of recommended services from the trained AI model, wherein the first plurality of recommended services is displayed to a user;

receiving a user selection of one of the first plurality of recommended services;

displaying the selected service as a link in the complex composite service chain;

ingesting, to the trained AI model, metadata corresponding to the selected service and responsively receiving a second plurality of recommended services, wherein the second plurality of recommended services are displayed to the user;

further training the trained AI model using the user selection;

constructing the trained AI model using the plurality of service providers, a plurality of resource types, a plurality of configurations, and a plurality of dependencies;

mapping a frequency of association of data sources and corresponding resource types across the plurality of service providers; and augmenting a metadata of templates and constructing a complex composite service chained pattern, the complex composite service chained pattern being a packaged definition of the templates representing a complex application, wherein the complex composite service chained pattern is displayable in a graphical user interface.

16. The computer program product of claim 15 wherein the actions further comprise:

receiving, from the trained AI model, a prerequisite service that corresponds to the selected service; and displaying the prerequisite service and depicting a visual link between the selected service and the prerequisite service.

17. The computer program product of claim 15 wherein the training and further training further comprises:

inputting a plurality of consumer metrics, a plurality of rating information, and a plurality of parameter mappings to the trained AI model; and inputting a plurality of user profile data to the trained AI model.

18. The computer program product of claim 15 wherein the actions further comprise:

training the trained AI model on a plurality of aspects regarding the plurality of services provided by the plurality of service providers, from across cloud service providers, wherein the plurality of aspects includes security aspects, compliance aspects, recommendation aspects, compatibility aspects, interdependency aspects, deployment aspects, data residency aspects, pre-requisites needed, dynamic pricing aspects, service availability aspects and validation aspects.

19. The computer program product of claim 15 wherein the actions further comprise:

discovering the plurality of service providers corresponding to the plurality of services.

20. The computer program product of claim 15 wherein the actions further comprise:

gathering data that includes a service metadata and a user profile data;

preprocessing and normalizing a plurality of data received from the plurality of service providers of the plurality of services;

encoding the preprocessed and normalized data into embeddings, wherein the embeddings include attribute embeddings, service embeddings, and user embeddings;

assessing a compatibility between the plurality of services;

identifying one or more prerequisite services that correspond to at least one of the plurality of services; and recommending the first plurality of recommended services, wherein the recommending includes a compatible service recommendation and a personalized recommendation of further services which are compatible with the selected service and can be chained together to form an assured deployable pattern.

* * * * *